No. 706,764. Patented Aug. 12, 1902.
E. M. LAWRENCE.
FISH FLAKING MACHINE.
(Application filed Dec. 13, 1901.)
(No Model.)
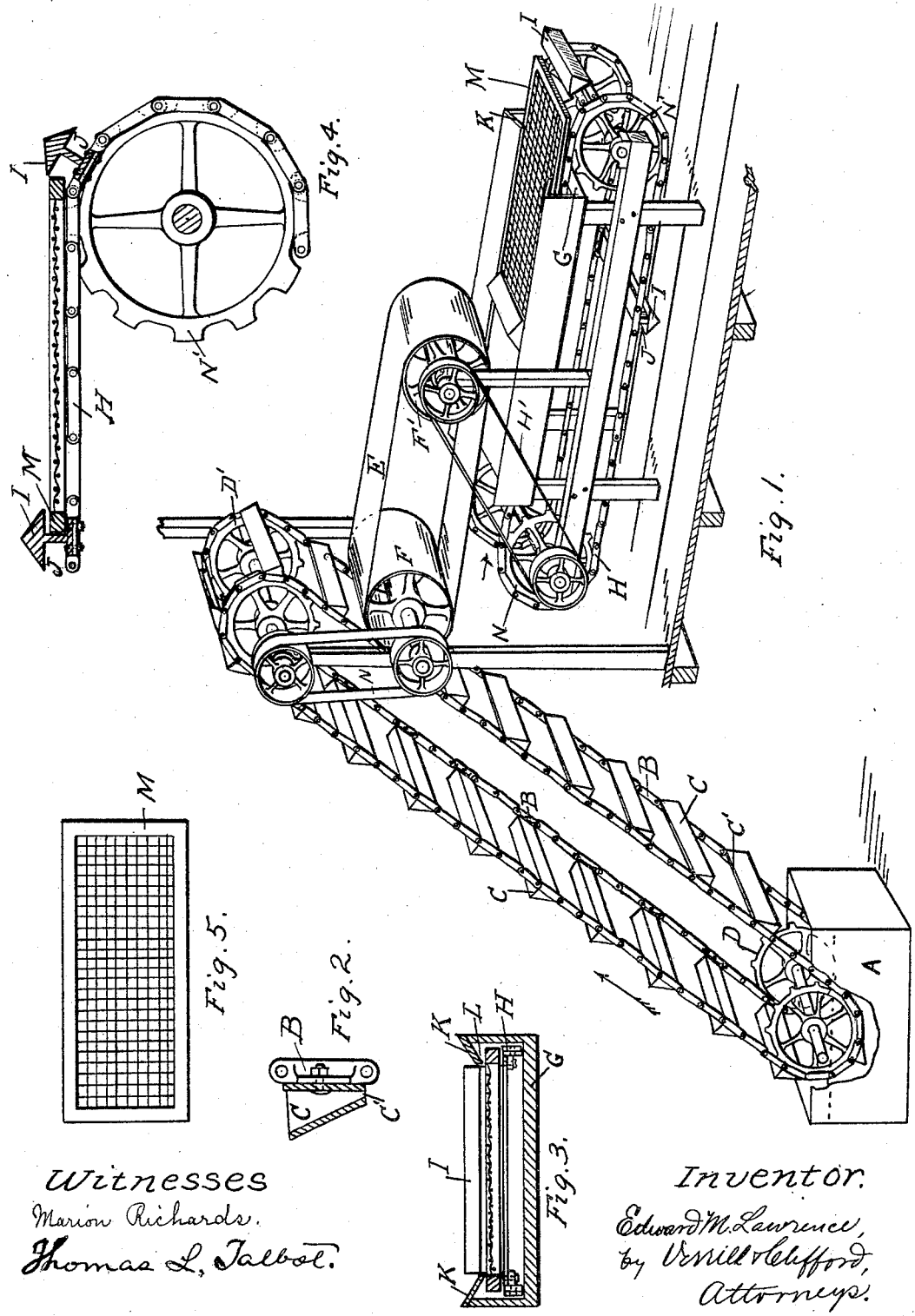
Witnesses
Marion Richards.
Thomas L. Talbot.
Inventor.
Edward M. Lawrence,
by Verrill & Clifford,
Attorneys.

UNITED STATES PATENT OFFICE.

EDWARD M. LAWRENCE, OF LUBEC, MAINE.

FISH-FLAKING MACHINE.

SPECIFICATION forming part of Letters Patent No. 706,764, dated August 12, 1902.

Application filed December 13, 1901. Serial No. 85,783. (No model.)

*To all whom it may concern:*

Be it known that I, EDWARD M. LAWRENCE, a citizen of the United States, residing at Lubec, in the county of Washington and State of Maine, have invented certain new and useful Improvements in Fish-Flaking Machines; and I do hereby declare the following to be a full, clear, and exact description of the invention, such as will enable others skilled in the art to which it appertains to make and use the same.

My invention relates to improvements in fish-flaking machines. In the preparation of small fish for canning it is customary to first immerse the fish in brine and put them upon flakes for the purposes of drying or cooking them preparatory to canning. These usually consist of a rectangular metallic frame in the center of which is a fine-wire mesh, the frame being usually of considerable width in order to give it the requisite rigidity to support the wire. It is found that the fish are cured more evenly and are consequently more uniform in quality when dried entirely on the mesh rather than in contact with the metal frame at the end and sides of the flake. It has also been customary to take the fish from the brine-tank and spread them on the flakes by hand.

The object of my invention is to provide a machine which will take the fish automatically from the tank, convey them to and spread them evenly upon the flake, and also to prevent them from falling upon the metal frame of the flake.

In the drawings herewith accompanying and making a part of this application, Figure 1 is an isometric view of my improved fish-flaking machine. Fig. 2 is a sectional view of the buckets which take the fish from the brine. Fig. 3 is a transverse sectional view of the flake-carrier table, showing the inclined side guards. Fig. 4 is an enlarged longitudinal sectional view of a portion of the flake-carrier table, showing two end guards with a flake between them; and Fig. 5 is a plan view of a flake.

Same letters of reference refer to like parts.

In said drawings, A represents a suitable tank adapted to contain a quantity of brine or other liquid and in which the fish are placed, floating freely in the liquid. An endless conveyer B, having a series of buckets C secured thereto in any convenient manner and provided with a small opening or openings C' in the bottom to allow the liquid to drain out, is driven by any suitable mechanism (not shown) and travels over sprockets D D', one located in the tank and the other at some distance above it. In connection with conveyer B is an endless apron E, passing over rotary drums F F' and driven in any convenient manner, as by belt N, connected with the drum D', which rotates the bucket conveyer. This endless apron may be made of canvas, rubber, or other suitable material and is positioned relative to conveyer B so as to receive the fish as they are dumped from the buckets. Beneath said apron is a flake-carrier table G, over which passes an endless carrier H, driven by any suitable mechanism, as by belt H', connected with drum F'. Said carrier H has a series of inverted-V-shaped guards I, set transversely thereof and secured thereto, the lower edges being raised a sufficient distance J above the carrier to enable the ends of the flake-frame M to be inserted thereunder, each member of the series being spaced apart from the next in the series a distance equal to the length of a flake. Downwardly and inwardly inclined guards K are secured to the sides of the table and have their lower edges raised above the carrier a distance L sufficient to enable the sides of the flake-frame when on the carrier to pass thereunder. The transverse guards mounted on the carrier and the guards K, supported on the carrier-table, prevent any fish from falling on the ends and sides, respectively, of the frame, which supports the mesh of the flake. The carrier-table is positioned relative to the apron so that fish are delivered from the apron upon the flakes as they move over the table.

The operation of my improved fish-flaking machine is as follows: The fish are taken from the liquid in the tank by the buckets, carried up over the drums, and are emptied upon the apron, whence they are carried along until they are delivered from the apron upon the flake which is moving underneath it. An operator stands at one end of the carrier-table and puts a flake upon the chain, pushing it under the edges of the side guards and under the edge of the guard in front of him and before the succeeding guard comes up over the end of the table, when the succeeding guard comes up and passes over the other end of the flake. The flake then passes along on the carrier and as it passes under the delivery-point of the apron is covered evenly with the fish delivered therefrom. The fish will be prevented from falling on the frame of the flake by the transverse and side guards, as aforesaid. As the flakes pass out over the opposite end of the table they are removed by an operator at that end.

It will be evident that the apron and its operating mechanism may be omitted and the fish dumped directly from the buckets upon the flakes, the object of the apron being to spread the fish out in thin even layers before they are delivered to the flakes. It will be evident also that the operating mechanism may be varied considerably without departing from the spirit or scope of my invention.

Having thus described my invention and its use, I claim—

1. In a fish-flaking machine, a tank adapted to contain fish suspended in liquid, an endless conveyer provided with a series of buckets adapted to take the fish from said tank, an endless carrier adapted to carry fish-drying flakes removably mounted thereon, means for preventing accidental displacement of the flakes on the carriage, and means for rotating said conveyer and carrier.

2. In a fish-flaking machine, a tank adapted to contain fish suspended in liquid, an endless conveyer provided with a series of buckets adapted to take the fish from said tank, an endless traveling apron adapted to receive the fish delivered by the buckets and spread them evenly, a carrier adapted to carry fish-drying flakes removably mounted thereon and to have an onward motion in a position to receive on said flakes the fish delivered by said apron and means for operating said conveyer, apron and carrier.

3. In a fish-flaking machine, a tank adapted to contain fish suspended in liquid, an endless conveyer provided with a series of buckets adapted to take the fish from said tank, a carrier-table, an endless carrier adapted to traverse said table, removable flakes supported on said carrier and positioned to receive the fish delivered by the buckets, means for preventing the fish from falling upon the flake-frame, and means for operating said conveyer and carrier.

4. In a fish-flaking machine, a tank adapted to contain fish suspended in liquid, an endless conveyer provided with a series of buckets adapted to take the fish from said tank, a carrier-table having inclined side guards, an endless carrier adapted to traverse said table and having inverted-V-shaped transversely-positioned guards spaced apart the length of a flake, removable flakes supported on said carrier, the frame of the flake being hidden by said guards and means for operating said conveyer and carrier.

In testimony whereof I affix my signature, in presence of two witnesses, this 4th day of December, 1901.

EDWARD M. LAWRENCE.

In presence of—
GEO. H. HAYES,
W. S. ALEXANDER.